May 12, 1931. A. H. G. GIRLING 1,804,929
EXPANDING BRAKE
Original Filed June 14, 1926   5 Sheets-Sheet 1
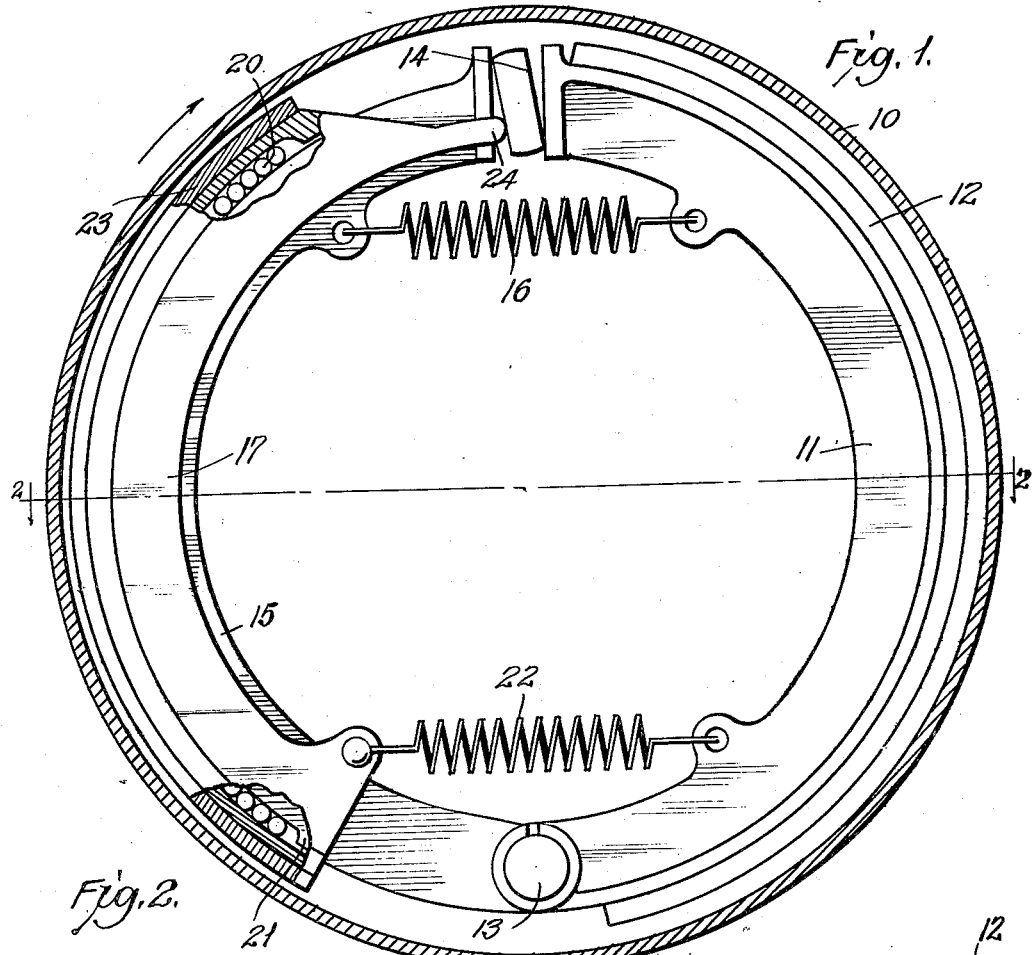
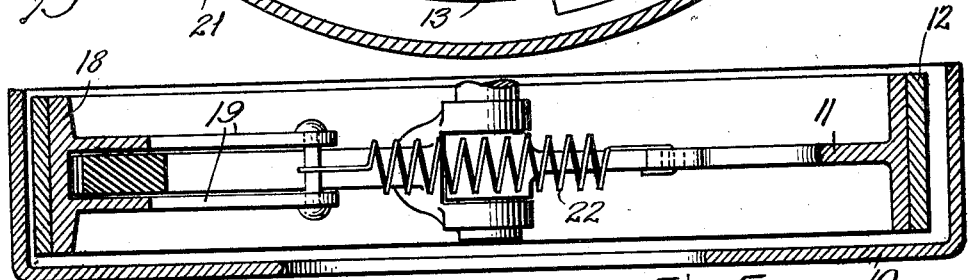
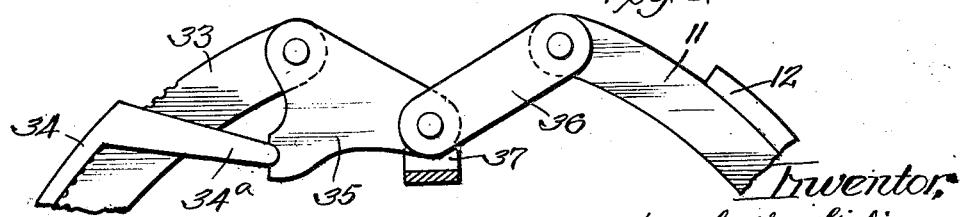
Inventor,
Albert Henry Godfrey Girling,

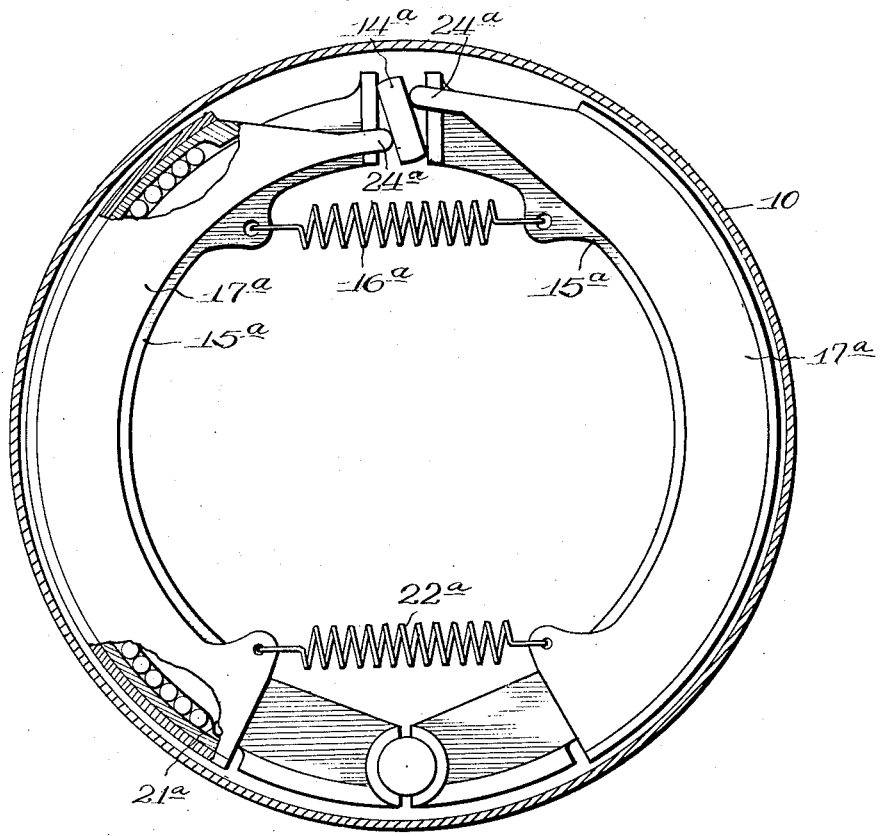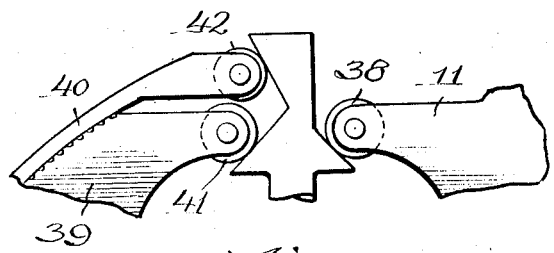

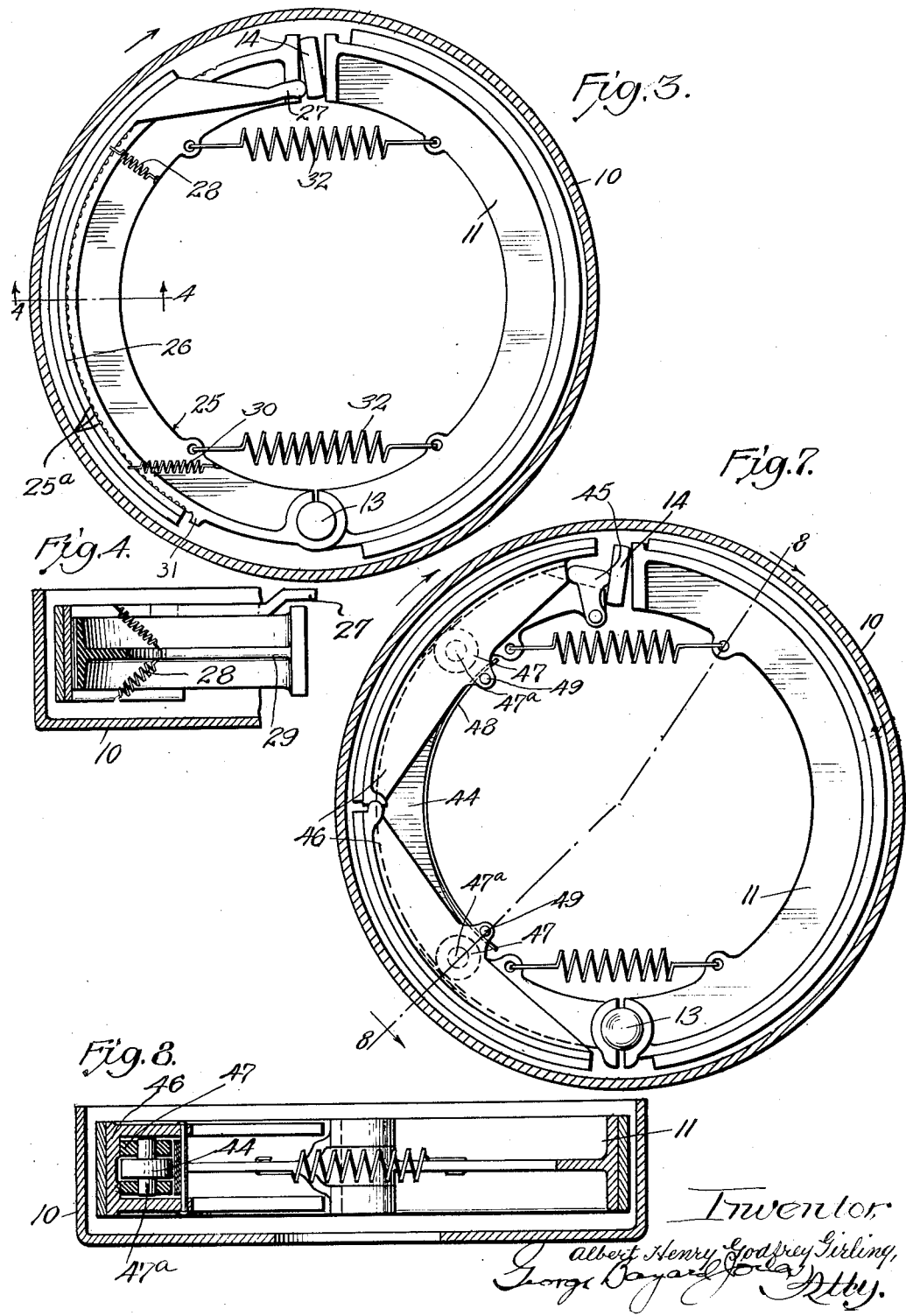

May 12, 1931. A. H. G. GIRLING 1,804,929
EXPANDING BRAKE
Original Filed June 14, 1926 5 Sheets-Sheet 4
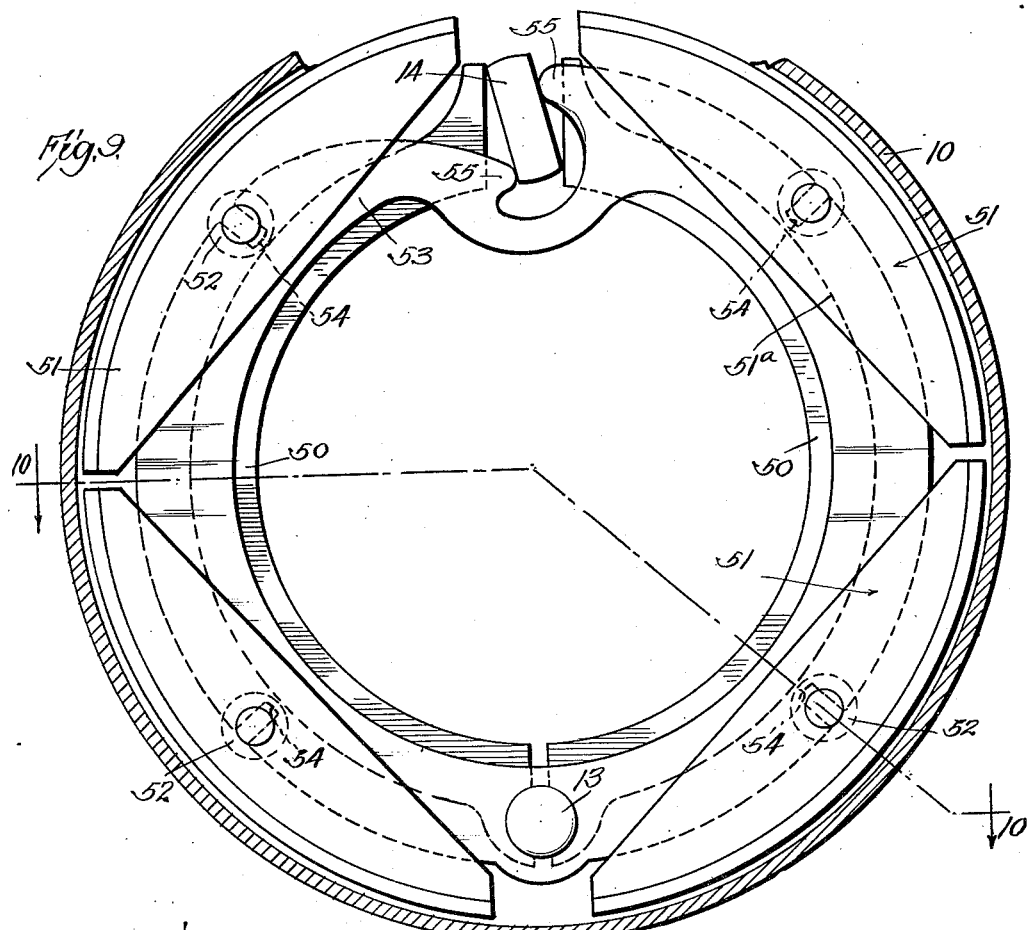
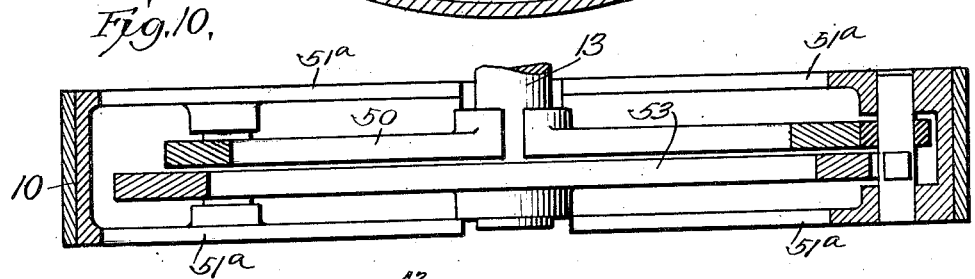
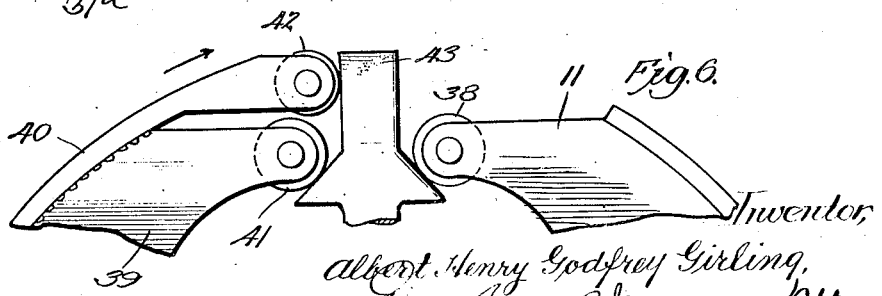

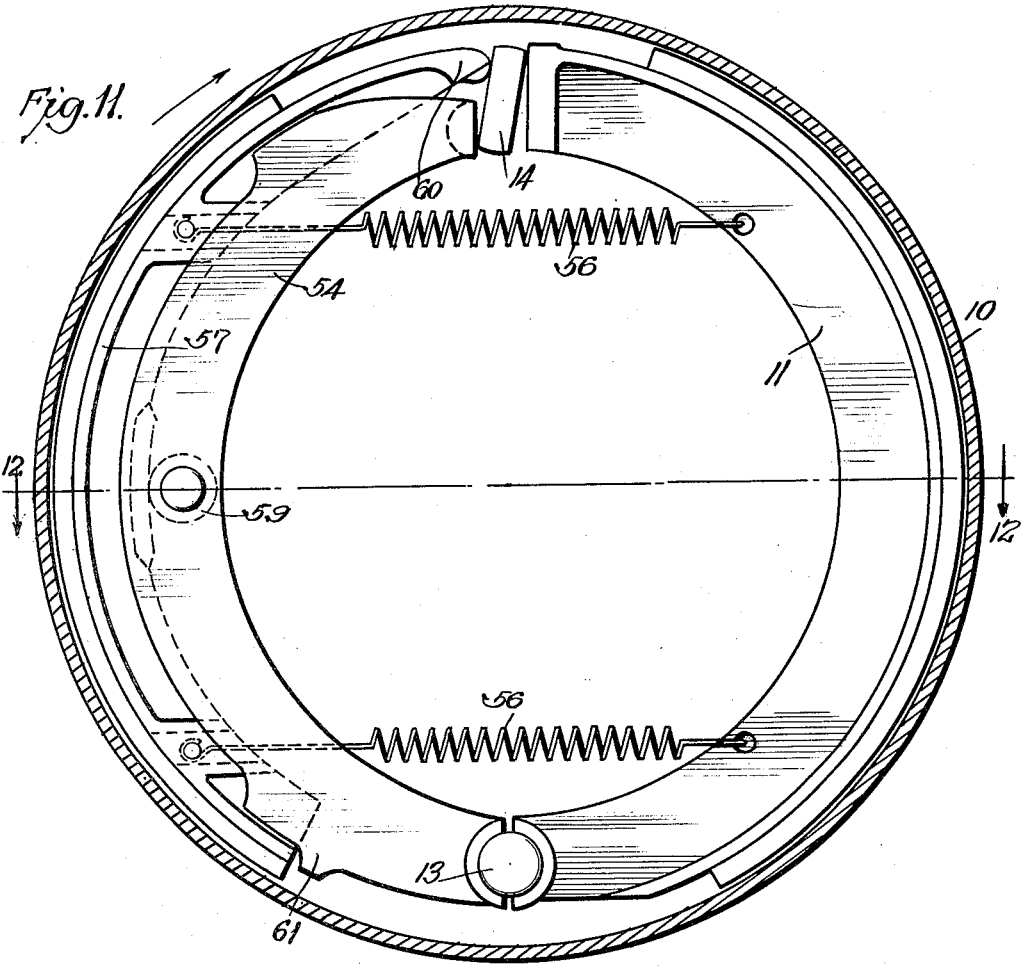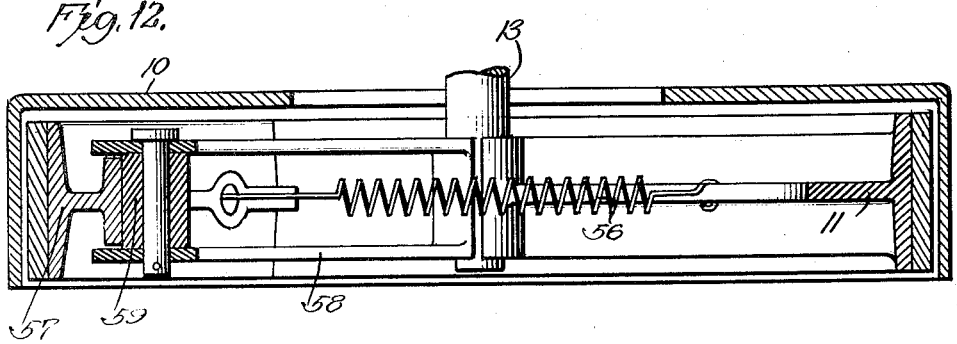

Patented May 12, 1931

1,804,929

UNITED STATES PATENT OFFICE

ALBERT HENRY GODFREY GIRLING, OF HARLOW, ENGLAND, ASSIGNOR TO BENDIX BRAKE COMPANY, OF SOUTH BEND, INDIANA

EXPANDING BRAKE

Application filed June 14, 1926, Serial No. 115,970, and in Great Britain June 17, 1925. Renewed November 27, 1929.

This invention relates to an expanding brake of the type wherein two brake-levers associated each with a brake-shoe are arranged to be moved apart by an expanding member so as to force the shoes against a rotary member to be braked.

In every two-shoe expanding brake of the type described used in motor vehicles both shoes tend under the frictional drag of the revolving drum to move outwards, thereby automatically increasing the pressure at their frictional faces. They are therefore both self-energizing, that is to say they develop a greater braking resistance than is due directly to the driver's effort. This increase in power is however neutralized by the effect of the tangential effort developed by the shoe which tends to move toward the expanding device, its pressure against the latter absorbs part of the driver's effort, reducing the amount available for expanding the shoes, and the net braking effect from the assembly is as though there were no self-energizing effect.

This invention has for its main object to provide that the tangential force aforesaid of one of the shoes (the one tending to move toward the expanding device) shall not act in opposition to the driver's effort, or if desired shall act in co-operation with his effort.

Another object is to provide an improved brake of the type described having a modified shoe or shoes whereby the said defect existing in brakes of the type above-mentioned is obviated. The improved brake-shoe can be made interchangeable with almost any existing shoe of a brake of this type, and it may be used in conjunction with many well-known types of expander for instance the cam, wedge and toggle types.

According to an important feature of the invention the tangential force developed in the shoe in the improved brake is transferred to the expander in such a way as to produce no resistance to the driver's effort, or so as to produce a turning moment or expansive force co-operating with that produced by the driver's effort. A very important feature is that the two moments or forces are exactly alike in direction and result, differing, if at all, only in magnitude. The result of the moment or force is in every case to produce forces tending to expand both shoes equally until the whole of the resultant forces (over and above the amount absorbed by friction) are developed as useful pressures distributed over the whole area of the frictional faces.

The importance of this feature is that it ensures the additional internal stresses due to the enhanced brake power being distributed in exactly the same manner as the original stresses, retaining the balance of forces of the brake of the type described known heretofore. The extra braking pressure is evenly distributed over the frictional area, and not concentrated on one small area, so that the liners wear evenly and the self-energizing effect on the expander is developed in such a way that it cannot under any circumstances affect or limit the movement of the expander and the forces it develops under the primary operating force. By arranging both shoes according to the invention like results can be obtained for each direction of rotation.

In an alternative construction of brake according to the invention a ring is mounted upon and free to rock about the pivot of the brake-levers. The centre of this ring is adjacent the axis of the brake drum. At a situation in the ring opposite to the pivot the ring is shaped so as to bear against the expanding device. Mounted on this ring are two or more shoes, there being an equal number on each side of the pivot. These shoes are free to move radially but not circumferentially in relation to the ring, and they can be expanded radially by the two brake-levers operated by the expander. When in contact with a rotating brake drum the tangential forces developed in the shoes are transferred to the ring which tends either to cause no reduction of the expansive force or to increase the expansive force developed by the expander. The effect may be made equal for either direction of rotation.

Several embodiments of the invention are illustrated by way of example in the accompanying drawings wherein—

Figure 1 is a side elevation of an expanding brake illustrating one form of the invention, parts of the structure being shown broken away.

Fig. 1ª is a side elevation showing a brake having two self energizing brake shoes for providing the supplemental braking effect when the brake drum is rotating in either direction.

Fig. 2 is a sectional plan view taken on line 2—2, Fig. 1.

Fig. 3 illustrates another structure embodying the invention.

Fig. 4 is a sectional plan view taken on line 4—4, Fig. 3.

Fig. 5 is an elevation of the expanding mechanism of the toggle type.

Fig. 6 is a similar view of a cam expanding mechanism.

Fig. 6ª is a modification of the form shown in Fig. 6.

Fig. 7 is a further modification of a brake.

Fig. 8 is a section taken on line 8—8, Fig. 7.

Fig. 9 is another embodiment of the invention.

Fig. 10 is a sectional plan view taken on line 10—10, Fig. 9.

Fig. 11 is another modification, and

Fig. 12 is a sectional plan view taken on line 12—12, Fig. 11.

In Figs. 1, 2, 3, 4, 6, 7, 8, 11 and 12, the invention is illustrated as being incorporated in a brake drum 10 in conjunction with what will be termed, a "standard brake shoe" 11, since it may not always be necessary to employ two of my improved brake shoes in each drum unless it is desired that the improved braking effect be available for reverse movement of the vehicle, as well as for forward movement.

In Fig. 1 of the drawings, the standard brake shoe 11 is shown provided with a brake band 12, and is pivoted at its lower end to the stationary pin 13, whereby rotation of the cam 14 will cause the band 12 to move into braking relation with the interior of the drum 10. Pivotally mounted on the same shaft or pin 13 is one form of my improved brake lever 15, which is connected by a spring 16 to the brake shoe 11. It will be understood, of course, as above mentioned, that instead of employing the standard shoe 11, mechanism similar to that shown on the left-hand side of the figure may be employed, if desired, as illustrated in Fig. 1ª whereby the improved braking effect of the present improvement will be available when the vehicle is moving backwardly.

A brake shoe 17 having a web 18 and parallel flanges 19 is movably mounted on the lever 15. Suitable anti-friction rollers or balls 20 may be interposed between the outer periphery of the lever 15 and the bottom of the channel formed between the flanges 19 for reducing friction between the shoe and the lever. A stop 21 is provided on the lever 15 for limiting the counter-clockwise movement of the shoe 17 on the lever 15 when moved from braking position by the retraction spring 22. The springs 16 and 22 in this modification of the invention may be the usual springs commonly employed in the ordinary brake drum consisting of a pair of complementary shoes similar to shoe 11. A brake band 23 may be attached to the surface of the shoe 17 for contact with the inner surface of the drum 10. The forward end of the shoe 17 is extended to form the cam contacting member 24.

When the cam 14 is rotated by suitable connections (not shown) with the brake lever of the vehicle, the shoe 11 and lever 15, together with shoe 17 are moved in directions to contact with the inner surface of the drum 10. Upon the engagement of the shoe 17 with the rotating drum said shoe moves on the lever 15 in the direction of the rotation of the drum whereby the extension of the shoe, or intermediate member 24, exerts a force on the cam 14 in a direction to supplement the initial braking movement. In the arrangement shown in Fig. 1, if the cam is rotated in a counter-clockwise direction for applying the brakes, the member 24 will supplement this movement since it contacts with the cam below the central horizontal axis upon which the cam rotates. It will be apparent that by forming the member 24 so as to contact with the cam in a horizontal plane passing through the axis of rotation, the force exerted by the shoe will be neutralized, that is, it will not supplement the initial braking effort supplied by the driver.

Upon releasing the brake, the spring 16 will withdraw the braking members from contact with the drum, while spring 22 will cause the shoe 17 to move in a counter-clockwise direction until the lower rollers 20 engage the stop 21. The direction of force exerted by spring 22 is substantially tangential to the curvature of the lever 15.

Fig. 1ª illustrates the same type of brake shoe shown in Figs. 1 and 2 except that the brake is self energizing in either direction of rotation of the drum, so the supplemental braking effect is obtained when the brake is applied while the drum is rotating in counter clockwise direction. In this form of the invention, the right hand shoe 17ª carried by lever 15ª has an extension or intermediate member 24ª which contacts with the cam 14ª above the axis thereof, and functions in the same manner as described above with reference to Fig. 1.

In Fig. 3, another form of my improved brake lever 25 is shown adapted to co-operate with the standard brake shoe 11. Co-operating with the brake lever 25 is a brake shoe 26 having an extension 27 which is adapted to bear against the cam 14, as described in the above modification. Instead of using ball or roller bearings between the lever 25 and shoe 26, one or both of the contacting surfaces of said members may be provided with fine transverse grooves or serrations 25ª for retaining lubricant such as graphite, or the like. In this figure, a spring 28 passes over the central flange 29 of the lever and has its end suitably attached to the shoe 26, whereby the latter is held in contact with the lever. Another spring 30 is positioned on said members in such wise as to exert a suitable tangential force, whereby the shoe 26 is moved in counter-clockwise direction, upon being released from braking position, until the rear end thereof is engaged by the stop 31, formed on the lever 25. Springs 32 of the usual form move the shoe 11 and lever 26 to inoperative position when the cam 14 is moved to the inoperative position, shown in said figure.

In Fig. 5, which is a fragmentary view of a somewhat similar construction shown in Fig. 3, a slightly modified standard shoe 11 is shown, together with a lever 33 provided with a shoe 34, which lever and shoe may be held in operative position by means of springs similar to those shown in Fig. 3. The shoe 11 and lever 33 are pivoted to the toggle levers 35 and 36, which in turn are pivoted to the member 37, which is adapted to be actuated vertically by a cam (not shown) during the braking of the vehicle. Upward movement of the member 37 will cause the shoe 11 and lever 33 to move in a direction to engage the inner surface of a drum (not shown), as will be clear. Upon the contacting of the shoe 34 with the drum the tangential force developed by such contact will cause the said shoe to move in a clockwise direction on the lever 33, whereby the member 34a which engages the toggle lever 35 will supplement the action of the cam, as will be clear. The lever 33 may also be serrated as shown for retaining lubricant.

In the form shown in Fig. 6, the standard shoe 11 is shown as being provided with a roller 38 at its upper end. The improved lever 39 is provided with the shoe 40 which members are provided with rollers 41 and 42, respectively. Instead of using the cam expander, as shown in the previously described forms of the invention, a wedge expander 43 is employed. The movement of the brake applying mechanism (not shown) causes the member 43 to move vertically, whereby the shoe 11, lever 39 and shoe 40 are moved outwardly, causing the shoes to contact with the inner surface of the drum (not shown). The tangential force developed by the contacting of the shoe 40 with the drum causes the former to move in a clockwise direction. If the expander 43 is formed, as shown in Fig. 6, the effect of the movement of the shoe 40 is not to supplement the original braking action, while, if the surface with which the roller 42 contacts is inclined as shown in Fig. 6ª, the movement of the shoe 40 will have a lifting effect on the member 43 and will thus supplement the initial force applied to the brakes. The lever 39 may be serrated as illustrated for retaining lubricant.

In Fig. 7 a different type of lever and shoe are employed in co-operation with the standard shoe 11. In this form the brake lever 44 has an intermediate member 45 pivoted thereto at its forward end, which intermediate member contacts with the cam expander 14. A brake shoe 46 is carried by the lever 44, which shoe is formed in two sections pivotally connected at their adjacent ends. The sections of the shoe 46 are held in contact with the central rollers 47 by means of the spring 48, the ends of which pass under pins 49, as shown in Figs. 7 and 8. The rollers are journaled on pins 47a fixed in the lever 44. The upper section of shoe 46 abuts the intermediate member 45, whereby movement of the shoe moves the member 45 into contact with the cam 14. In the particular relation shown in Fig. 7, the force developed by the shoe contacting with the drum will not supplement the expanding force of the cam for the reason that the member 45 contacts with the cam in the horizontal plane passing through the cam axis. In this construction, the two parts of the shoe are expanded by approximately central pressure and are flexibly joined at their adjacent ends to cancel out the tipping tendency of each shoe due to the movement about the axis of the pivot.

Fig. 9 shows a further form of my improvements, wherein the standard brake shoe is omitted. In this form, brake levers 50 are shown pivoted to the shaft 13, which levers are adapted to be expanded by means of the cam 14. The brake shoes in this form of the invention are shown as being formed each in two sections 51 having side flanges 51a which embrace the levers 50. Suitable central antifriction rollers 52 are provided which bear on the outer surface of the levers. A ring member 53 which pivots on shaft 13 is provided with slots 54, the trunnions of the rollers 52 being guided in the slots to permit radial movement of the rollers. When the brake levers 50 are expanded by the cam 14, the tangential force developed by the contact of the shoes 51 with the drum 10 is transmitted to the ring 53, due to the construction just described. The upper intermediate portion of the ring is shaped to provide horns 55, one or the other of which bears against the cam 14 when the ring 53 is oscillated. If the drum is rotating in clockwise direction, the ring 53 will be moved in clockwise direction when the shoes 51 have been brought into contact with the drum, and the lower of the horns 55 will exert a force on the cam 14 which will supplement the initial braking force supplied thereto by the driver of the vehicle. If the vehicle is going in the opposite direction and the brake of the vehicle is applied, the upper horn 55 will thus supplement the initial braking force.

In the form shown in Fig. 11, a standard brake shoe 11 is shown, which is connected by means of springs 56 to the improved shoe 57 which is held by said springs on the lever 58, which lever is provided with a roller 59 and reduces friction between said members. When the cam 14 is rotated in a clockwise direction to expand the shoe 11 and lever 58, the tangential force developed thereby will cause the shoe 57 to move in the direction of rotation of the drum 10, whereby the forward end 60 will bear against the cam 14 at a point above its central axis and thus supplement the expanding action of the cam. The lower spring 56 will cause the shoe 57 to move in the reverse direction when the cam is permitted to return to normal position, the reverse movement of the said shoe 57 being limited by the stop 61.

Although I have shown certain features of my improvements for the purpose of illustration, it will be apparent that various changes may be made therein without departing from the invention defined by the following claims.

I claim:

1. An expanding brake comprising in combination two brake-levers arranged to be moved towards and away from one another, two brake shoes associated each with one of said levers, and an expanding member arranged to move said levers apart and force the shoes against a rotary member to be braked, at least one of which shoes is so mounted as to be movable in relation to its associated lever and to exert pressure upon said expanding member under the action of a tangential drag during the braking operation at such point as not to oppose the brake-expanding force applied to said expanding member, substantially as described.

2. An expanding brake comprising in combination two brake-levers arranged to be moved towards and away from one another, two brake shoes associated each with one of said levers, and an expanding device arranged to move said levers apart and force the shoes against a rotary member to be braked, at least one of which shoes is so mounted as to be movable in relation to its associated lever and to exert pressure upon said expanding device under the action of a tangential drag during the braking operation at such point as to assist the brake-expanding force applied to said expanding member, substantially as described.

3. An expanding brake comprising in combination two brake-levers arranged to be moved towards and away from one another, two brake shoes associated each with one of said levers, and a pivoted expanding member arranged to move said levers apart and force the shoes against a rotary member to be braked, both of said shoes being so mounted as to be movable each in relation to its associated lever, one or the other of said shoes being adapted to act on said expanding member at opposite sides of the axis of rotation thereof under the action of a tangential drag during the braking operation to thereby supplement the brake-expanding force applied to said expanding member.

4. An expanding brake comprising in combination two brake levers arranged to be moved towards and away from one another, two brake shoes associated each with one of said levers, an expanding member arranged to move said levers apart and force the shoes against a rotary member to be braked, one of which shoes is so mounted as to be movable in relation to its associated lever in the direction of length of the same, and an intermediate member arranged between the movable shoe and the expanding member, which intermediate member so co-operates with said expanding member under the action of a tangential drag on the shoe during the braking operation as not to oppose the brake-expanding force applied to said expanding member, substantially as described.

5. In an expanding brake of the type described, the combination with a pivoted brake-lever, of a brake shoe mounted thereon so as to be movable along the same, which lever has a stop for co-acting with said shoe and limiting its movement in one direction thereof, for the purpose described.

6. A brake lever having a brake shoe thereon adapted for installation in a vehicle braking mechanism comprising an expanding device and a rotary member to be braked, said shoe being movable relatively to the lever under the tangential drag of the rotary member, and having means for contacting with the expanding device to augment the expanding action thereof, said means comprising an extension of the shoe disposed intermediate the shoe and expanding device.

7. Apparatus of the class described comprising a rotary drum to be braked, a pair of brake levers therein, a device for expanding said levers toward said drum, a pair of shoes one carried by each lever and being movable thereon under the tangential drag of the rotating drum when said shoes are in contact therewith, each of said shoes having an extension one of which is adapted to exert pressure upon said expanding device upon rotation of the drum in one direction and the other extension adapted to exert pressure on the device upon opposite rotation of the drum whereby the expanding force of said device is augmented.

8. Apparatus of the class described comprising a rotatable brake drum, a pair of brake levers therein, an expanding device in said drum for moving said levers toward said drum, and means within the drum carried entirely by said levers for supplementing the force initially applied to said expanding device during the braking operation.

9. Apparatus of the class described comprising a rotatable brake drum, a pair of brake levers therein, an expanding device in said drum for moving said levers toward said drum, and means within the drum carried entirely by said levers for supplementing the force initially applied to said expanding device during the braking operations, said means comprising a movable brake shoe and a member actuated thereby into contact with said expanding device.

10. The combination with a brake comprising a rotary drum, and a brake lever pivotally mounted therein, of a second brake lever adapted to be mounted on the pivot, an expanding device for moving said levers toward said drum upon the actuation of said device, and a brake shoe on said last mentioned lever, said shoe being arranged for movement toward said device under the action of the tangential drag when in contact with said drum during the braking operation whereby said shoe exerts pressure on a surface of said device and serves to augment the original expanding force applied to said device.

11. Means for converting a brake comprising a brake drum, a pair of pivoted levers and an expanding device into a self energizing brake, said means comprising a lever adapted to be mounted on the pivot in substitution of one of said other levers, and a shoe on said substituted lever movable toward said device under the tangential drag on said shoe when expanded into contact with the rotating drum, whereby said shoe serves to supplement the original expanding force of said device.

12. The combination with a rotary brake drum, of a pair of levers therein operable upon a stationary pivot, an expanding cam disposed between the opposite ends of said levers and being adapted to move said levers upon the pivot toward said drum, a shoe on one of said levers adapted to contact with the drum when said cam is actuated, said shoe being movable on the lever in a direction toward said cam, and means in said drum interposed between said shoe and cam and adapted to contact with the latter for translating the movement of the shoe into rotative movement in the cam to augment the expanding force thereof upon said levers.

13. In combination a brake drum having a stationary pivot therein, a pair of brake levers mounted on said pivot, a cam disposed between the free ends of said levers and being adapted to expand said levers toward said drum during the braking operation, and a brake shoe movable on one of said levers toward said cam when said shoe is in contact with the rotating drum, said shoe having a forward extension contacting with said cam at such a point with reference to the axis of the cam as not to oppose the original braking force applied thereto.

14. A brake comprising, in combination, a rotatable element to be braked, a lever operated friction device arranged to contact with a lever applying means in such a manner as to augment the applying action thereof with the element rotating in one direction, together with a second rigidly anchored friction device arranged to be directly contacted by said applying means, said first-mentioned friction device being so arranged with respect to the aforementioned lever as to anchor thereon as the element to be braked rotates in the reverse direction.

15. A brake comprising, in combination, a rotatable drum, a friction device adapted to be thrust into engagement with said drum by a lever member upon which it is mounted, an applying means for actuating said lever, said device being so mounted on said lever as to move relative thereto to augment the action of said applying means when the drum is rotating in one direction but with the drum rotating in the reverse direction moving to contact a portion of said lever.

In testimony whereof I affix my signature.

ALBERT HENRY GODFREY GIRLING.